Feb. 12, 1957 C. G. KUCZUN ET AL 2,781,423
AMPLIFIER GAIN-STABILIZATION
Filed May 18, 1953 2 Sheets-Sheet 1

INVENTORS
CHESTER G. KUCZUN
PAUL A. HUSMAN
BY Joseph Weingarten
ATTORNEY

AMPLIFIER GAIN-STABILIZATION

Filed May 18, 1953 2 Sheets-Sheet 2

INVENTORS
CHESTER G. KUCZUN
PAUL A. HUSMAN
BY Joseph Weingarten
ATTORNEY

United States Patent Office 2,781,423
Patented Feb. 12, 1957

2,781,423

AMPLIFIER GAIN-STABILIZATION

Chester G. Kuczun, Brighton, and Paul A. Husman, Reading, Mass., assignors to Laboratory for Electronics, Inc., Boston, Mass., a corporation of Delaware Application May 18, 1953, Serial No. 355,596

13 Claims. (Cl. 179—171)

The present invention relates in general to signal amplification systems and more particularly concerns the stabilization of the gain of an amplifier against variations in system parameters which ordinarily tend to cause undesirable and unpredictable gain drift as a function of time.

The concepts disclosed herein are primarily applicable to amplifiers having a plurality of parallel connected amplifier channels yielding an over-all transmission band width characteristic broader than that available from any one of the individual channels so arranged. Such multi-channel combinations are currently in extensive application, the most common being a dual-channel system consisting of separate low and high frequency amplifiers energized in parallel from common input terminals and feeding an output circuit through a frequency selective cross-over network.

This invention contemplates and has as a primary object the provision of a broad-band multi-channel amplifier in which one or all of the parallel amplification channels are reliably stabilized to preclude unwanted variations from a pre-established over-all gain characteristic. In a specific aspect of the present invention, one channel of a dual-channel amplifier is gain-stabilized by a pilot signal whose frequency, though within the pass band of the amplifier as a whole, neither interferes with amplifier operation nor appears spuriously in the system output. Resultantly, when the stabilized channel gain is preset to equal the gain of its parallel channel, an exceptionally uniform and time-stable relative response characteristic is achieved for a frequency spectrum between opposite extreme cut-off points of both channels.

A further object of the present invention is to incorporate dependable pilot signal gain stabilization techniques into multi-channel amplifiers, all stabilizing frequencies being arranged with respect to other circuit parameters to obviate cross-coupling and the appearance of control signals in the system output.

These and other objects of the present invention will become apparent from the following detailed specification with reference to the accompanying drawing, in which.

Figure 1:
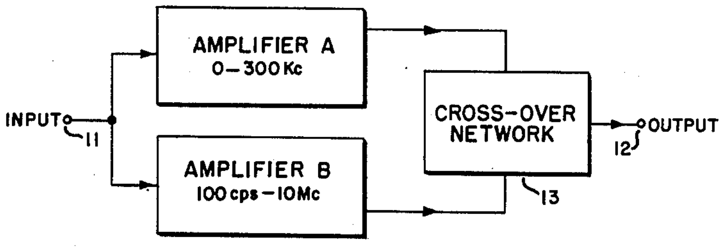
Fig. 1 is a block diagram of a dual-channel amplifier of customary design.

For introductory purposes and as an aid to understanding the novel concepts of this invention, certain features of a conventional dual-channel amplifier, as illustrated in Fig. 1, will be discussed briefly. Signals appearing at input terminal 11 are simultaneously applied to the inputs of two parallel amplifier channels, herein designated as A and B; and after amplification, a single output is derived at terminal 12 through a cross-over network 13.

Figure 2:
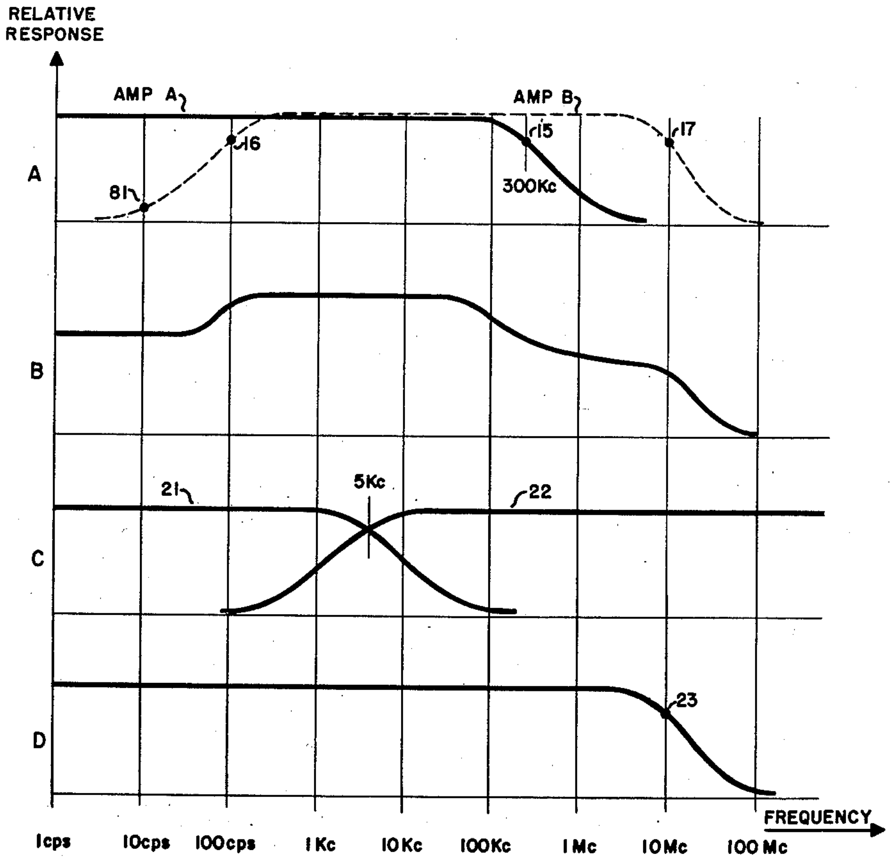
Fig. 2 is a graphical representation of frequency response characteristics, all plotted to a common frequency scale, which will prove of assistance in an explanation of this invention.

Consider as a representative problem, the design of an amplifier embodying this basic design philosophy and capable of equally amplifying signals lying in the spectrum between zero frequency (D. C.) and 10 mc. Channel A may, without undue difficulty, be designed for uniform response throughout the band between D. C. and a cut-off point arbitrarily selected at 300 kc., while channel B parameters may be chosen to accommodate signals lying within the spectrum between 100 C. P. S. and 10 mc. Fig. 2(A) graphically illustrates the relative response characteristics of channels so designed, plotted on a common decade frequency scale. Point 15 is indicative of the high frequency cut-off of channel A, while points 16 and 17 indicate the low and high cut-off points, respectively, for channel B.

Evidently, if amplifiers A and B in Fig. 1 were of equal gain and their outputs linearly summed, a conspicuous step would appear in the over-all transmission characteristic, as illustrated in Fig. 2(B). Through the use of cross-over network 13, having relative response characteristics about a cross-over frequency of 5 kc. with respect to channels A and B, respectively, as illustrated by curves 21 and 22 in Fig. 2(C), the combined transmission characteristic between input terminal 11 and output terminal 12 becomes uniform and flat as shown in Fig. 2(D). The high frequency cut-off point 23 is at 10 mc.

Despite the widespread application of such basic dual-channel amplifiers, there exist numerous well-recognized, inherent limitations which have materially limited the quantitative applications thereof. From a practical engineering standpoint, it is possible to design low frequency amplifier, channel A, for excellent stability against gain drift by an appropriate choice of circuit components. Channel B poses a more substantial problem by virtue of the high frequencies involved, and the choice of quality components will not by itself prevent both short-term and long-term gain drift. Thus, a new amplifier, initially adjusted to respond as Fig. 2(D), will in time change significantly to present a less desirable response, as for example, Fig. 2(B).

Figure 3:
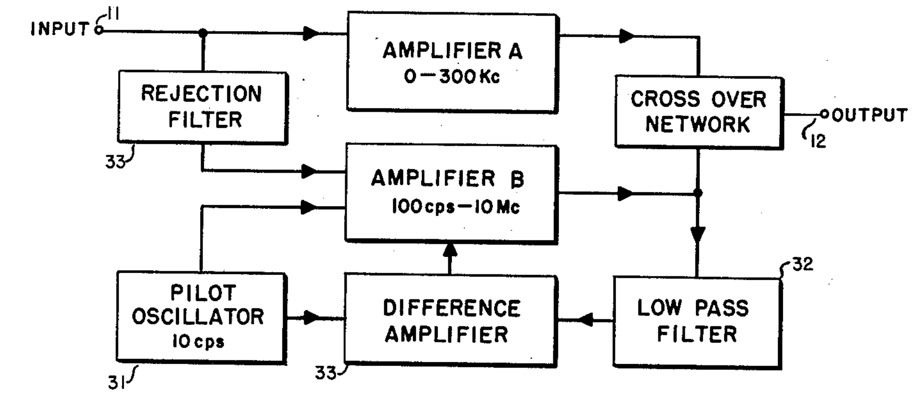
Fig. 3 is a generalized block diagram of a dual-channel amplifier incorporating the novel gain-stabilization techniques featured in the present invention.

With specific reference to Fig. 3, there is shown as a block diagram, a dual-channel amplifier embodying means for stabilizing the gain of high frequency amplifier, channel B, whereby once adjusted to provide a characteristic such as Fig. 2(D), subsequent aging and other variations will be substantially automatically and instantaneously compensated to prevent erratic frequency response. In this figure, those elements which are conventional in the sense that they are substantially similar to items already discussed in connection with Fig. 1, have been designated by like reference characters. For purposes of the present discussion, it will be assumed that the design frequency specifications of channels A and B and, consequently, of the whole system shown in Fig. 3, are the same as those noted earlier in connection with Fig. 1.

Amplifier channel B in Fig. 3 is gain-stabilized by a low frequency signal (herein selected as 10 C. P. S.) from a pilot oscillator 31. The pilot signal is injected into the input of channel B and is taken from the output thereof through a low-pass filter 32. The latter signal is then compared in magnitude in difference amplifier 33 with the magnitude of the output of the pilot oscillator itself. The output fluctuations of difference amplifier 33 are utilized to control correspondingly the gain of channel B, wholly independent of the gain of channel A.

It will be observed that the input signal at terminal 11 is applied to amplifier B through a rejection filter 33, whose function is to avoid the application to amplifier B of input signals lying in the spectrum of the pilot oscillator signal with minimum interference with the remainder of the signal spectrum.

The block diagram of Fig. 3 is intended primarily to disclose the logical arrangement and interconnection of salient circuit elements for gain-stabilization in a dual-channel amplifier. Thorough analysis of system operation will be advanced in the following discussion of Fig. 4, wherein all circuits, with the exception of low frequency amplifier channel A, rejection filter 33, and pilot oscillator 31, have been schematically illustrated for a fuller understanding thereof. Specifically, the signal input applied to terminal 11 is directly coupled to amplifier A through rejection filter 33 to the control grid of electron tube 41, functioning as the input stage of amplifier B. As noted earlier, filter 33 is arranged to preclude the application to tube 41 of any component of the input signal at terminal 11 which may lie in the spectrum of the pilot oscillator 31. With pilot oscillator operative at 10 C. P. S., filter 33 may comprise, for example, a conventional bridged T network having maximum rejection at 10 C. P. S. with negligible effect on the remainder of the frequency spectrum. By so filtering the input to the grid of tube 41, amplifier B will remain non-responsive to signals at pilot frequency from sources other than the pilot oscillator.

One output of pilot oscillator 31 is coupled through capacitor 43 to the cathode of tube 41 of amplifier B. This input in no way affects operation of amplifier B in response to signals applied through filter 33. In other words, except for the control function to be described, normal high frequency performance of amplifier B remains independent of the pilot signal applied thereto.

The signal output of tube 41 is capacitively coupled to the control grid of a gain-controlling triode amplifier 45 whose output is in turn coupled to the remaining stages (not shown). The amplifier output of channel B, as it appears at junction 46, is combined with the output of amplifier A through the cross-over network which is seen to consist of the series combination of resistor 51 and capacitor 52. The ultimate output of the dual-channel amplifier is derived at terminal 12 from the junction of the components forming the cross-over network.

At junction 46, the output of amplifier B will include both the signal applied to the control grid and the 10 C. P. S. signal applied to the cathode of tube 41. By means of a low-pass filter consisting of resistor 53 and capacitor 54 in series, the 10 C. P. S. signal appearing at the output of amplifier B is selectively applied to diode 55, poled as shown in the drawing, to yield a positive potential across the parallel combination of resistor 56 and capacitor 57. Resistor 53 is of comparatively large magnitude whereby the effect of filter 53—54 in shunting the output of amplifier B is negligible with respect to the high frequency output components thereof.

A second output of pilot oscillator 31 is applied to diode 61 poled to provide a positive potential across resistor 62 and capacitor 63 in parallel. The potential appearing across resistor 62 and representing the magnitude of the pilot oscillator signal is applied to one grid of the difference amplifier dual triode 64, while the potential appearing across resistor 56 and representing the magnitude of the pilot signal output of amplifier B is applied to the other grid thereof. The cathodes of twin triode 64 are joined in parallel and returned to a suitable negative source (B—) through unbypassed resistor 65. One of the triode plates is returned directly to the positive source (B+), while the other is coupled through resistor 66 to furnish a difference output at junction 67.

Potentiometer 71 couples junction 67 to the negative source (B—) and the potentiometer tap is used to apply a gain-control signal through resistor 72 to the control grid of triode 45. Capacitor 73 serves to further filter the gain-control potential.

Figure 4:
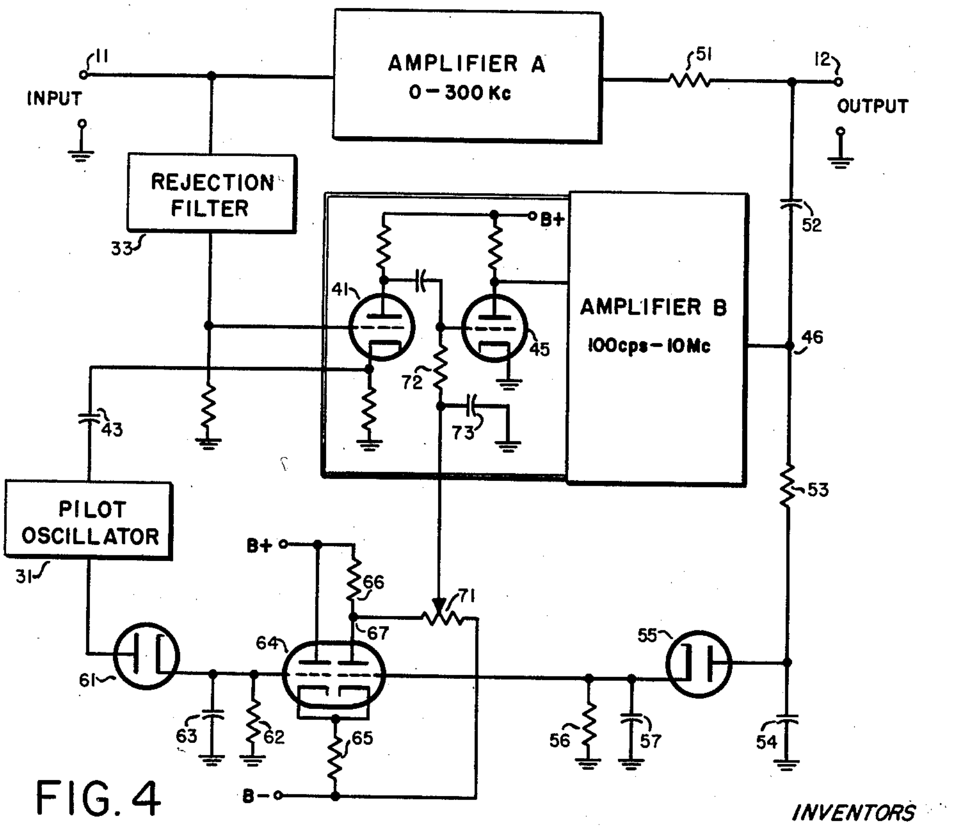
Fig. 4 is a circuit diagram of the system disclosed in Fig. 3, in which certain details have been amplified by presentation in detailed schematic form.

Having thus set forth the details of the circuits shown in Fig. 4, a critical analysis may now be made of stabilization operation. Assume the initial establishment of the gain of amplifier B to equal the gain of amplifier A. The response curves of Fig. 2(A) are then illustrative of performance. Cross-over network 51—52, having the characteristics of Fig. 2(C), will thereby provide at output terminal 12 the desirable uniform, flat response curve of Fig. 2(D). Now then, in the event that parameter variation tends to cause a significant increase in the gain of amplifier B, the 10 C. P. S. signal injected through capacitor 43 will be amplified to a greater degree to yield a positive signal of larger magnitude across resistor 56 which, in turn, lowers the potential at junction 67. Consequently, a negative going gain-control potential will be applied to triode 45 automatically adjusting the gain to the initial value shown in Fig. 2(A). Gain drift in the opposite direction will be correspondingly compensated by an opposite gain-control potential adjustment. A biased diode clamping circuit (not shown) may be connected to the gain-control connection to prevent the gain-control signal from exceeding a predetermined value.

Of particular advantage is the fact that pilot oscillator 31 need not be amplitude-stabilized in and of itself. This follows because the development of a gain-control signal is dependent upon the difference in positive potentials appearing across resistors 62 and 56. Thus, if the amplitude of the pilot oscillation should increase during a period of constant gain for amplifier B, the signals compared by twin triode 64 will both be proportionately greater; whereby the gain-control output of twin triode 64 will remain unchanged.

It is recognized that pilot signal gain-stabilization is not a particularly recent concept. However, it is of special interest to note that the pilot signal frequency selected herein for stabilization purposes lies within the spectrum of signals which may be anticipated at amplifier input terminal 11. With specific reference to Fig. 2(A), point 81 represents the relative response of amplifier B to the pilot signal frequency of 10 C. P. S. Clearly, although amplifier B is capable of passing such frequencies, the response is far below the response in the frequency range between low and high frequency cut-off points 16 and 17, respectively. Thus, the pilot signal frequency may be characterized as being less than the low frequency cut-off point of the amplifier being stabilized, while being sufficiently high for availability of some useful gain. At junction 46 in Fig. 4, the magnitude of the pilot signal will be far below that of an equal amplitude input signal in the frequency range between low and high frequency cut-off points of channel B. Notwithstanding this difference, the pilot signal amplitude is not insignificant at this point and would represent a serious distortion if coupled to the signal output.

Examination of curve 22 in Fig. 2(C) reveals that the selection of a cross-over network frequency of 5 kc. renders negligible the response at output terminal 12 to 10 C. P. S. signals appearing at junction 46. Thus, not only is the response of amplifier B to the pilot signal frequency relatively low, but the combined response thereto of amplifier and cross-over network, as viewed from output terminal 12, is less than measurable. Because injection of the pilot signal occurs in the cathode circuit of tube 41, no coupling whatsoever exists between the pilot oscillator and amplifier A which, it should be observed, is capable of passing at full gain frequencies, such as the pilot signal.

Specific frequencies have been used in this presentation of the performance of the dual-channel amplifier herein disclosed. However, it is evident that the frequencies utilized practically will be dependent upon the particular amplifier application under consideration. In dual-channel applications, the relative disposition of the frequencies within the over-all spectrum encompassed by the amplification system may be expected to appear in the same pattern exemplified by Fig. 2.

The present invention is by no means limited in principle to dual-channel operation. To illustrate broadly an extension of the principles herein described, consider an amplifier accommodating a desired broad frequency band by partition thereof into $n$ overlapping sub-bands having outputs combined through appropriate filters, similar functionally to the cross-over network discussed above. Without departure from the general principles hereinabove set forth, each or all of the $n$ amplifier channels may be stabilized against gain variation. A pilot signal whose frequency is not within the normal pass spectrum of the $i^{th}$ sub-band amplifier may be used to stabilize the $j^{th}$ sub-band amplifier. Although the pilot signal will pass through the channel being stabilized with a response sufficient to actuate the stabilization circuit, the combining filters will render pilot signal response negligible when considered from the system output circuit.

In view of the fact, therefore, that numerous modifications may now be made by those skilled in this electrical art, the invention herein is to be construed as limited only by the spirit and scope of the appended claims.

What is claimed is:

1. In an electrical signal amplifier providing a substantially uniform gain characteristic throughout a spectrum between predetermined low and high cut-off frequencies, at least first and second amplifier channels connected substantially in parallel between a common input and output and selectively accommodating overlapping portions of said frequency spectrum, means for stabilizing the gain of said second amplifier channel comprising a pilot signal source, means for coupling said pilot signal source to the input of said second channel, means for providing a gain-control signal to said second channel in response to the relative output of pilot signal from said second channel, the frequency of said pilot signal lying within the portion of said frequency spectrum accommodated by said first amplifier channel and outside of frequency spectrum effectively accommodated by said second amplifier channel.

2. In an electrical signal amplifier providing a substantially uniform gain characteristic throughout a frequency spectrum between predetermined low and high cut-off frequencies, at least first and second amplifier channels connected substantially in parallel between a common input and output and selectively accommodating overlapping portions of said frequency spectrum, means for stabilizing the gain of said second amplifier channel comprising a pilot signal source, means for selectively coupling said pilot signal to said second channel, means for providing a gain-control signal for said second channel in response to the relative output of pilot signal from said second channel, and selective means for precluding application to said second channel of signals from said common input at the frequency of said pilot signal.

3. A dual-channel amplifier comprising, a low frequency amplifier providing amplification in a spectrum extending upward between first and second cut-off frequencies, a high frequency amplifier providing amplification in a spectrum extending upward between third and fourth cut-off frequencies, said third cut-off frequency being intermediate said first and second cut-off frequencies, a cross-over network for selectively combining the outputs of said low and high frequency amplifiers and having a cross-over frequency intermediate said third and second cut-off frequencies, a source of pilot signal at a frequency lying between said first and third cut-off frequencies, means selectively applying said pilot signal from said source to said high frequency amplifier, means for selectively extracting said pilot signal in the output of said high frequency amplifier, and means responsive to the difference between said pilot signal input to and output from said high frequency amplifier for stabilizing the gain of said high frequency amplifier.

4. A dual channel amplifier comprising, a low frequency amplifier providing amplification in a spectrum extending upward between first and second cut-off frequencies, a high frequency amplifier providing amplification in a spectrum extending upward between third and fourth cut-off frequencies, said third cut-off frequency being intermediate said first and second cut-off frequencies, means for applying dual-channel amplifier input signals substantially in common to said low and high frequency amplifiers, a cross-over network energized from and selectively responsive to the outputs of said low and high frequency amplifiers and providing the dual-channel amplifier output, said cross-over network having a cross-over frequency intermediate said third and second cut-off frequencies, a pilot signal source, the frequency of said pilot signal being intermediate said first and third cut-off frequencies, means for selectively applying said pilot signal from said source to said high frequency amplifier, means for selectively extracting said pilot signal at the output of said high frequency amplifier, means for detecting the difference between said pilot signal amplitude as applied to said high frequency amplifier and said pilot signal amplitude at the output of said high frequency amplifier to provide a control signal, and means for applying said control signal to said high frequency amplifier for stabilization of the gain thereof.

5. Apparatus as in claim 4 wherein said cross-over network provides substantially negligible transmission of signals at said pilot frequency between the output of said high frequency amplifier and said output of said dual-channel amplifier.

6. Apparatus as in claim 5 wherein said means for selectively extracting said pilot signal from the output of said high frequency amplifier comprises a filter having substantially negligible effect upon frequencies in the output of said high frequency amplifier in the spectrum between said third and fourth cut-off frequencies.

7. Apparatus as in claim 6 wherein the gain of said high frequency amplifier at the frequency of said pilot frequency is substantially less than the gain thereof between said third and fourth cut-off frequencies.

8. Apparatus as in claim 7 and including a rejection filter in circuit between said dual-channel input and the input of said high frequency amplifier, said rejection filter substantially precluding the application to said high frequency amplifier of signals from said dual-channel amplifier input at pilot signal frequency.

9. A dual-channel amplifier comprising, a low frequency amplifier providing amplification in a spectrum extending upward between first and second cut-off frequencies, a high frequency amplifier providing amplification in a spectrum extending upward between third and fourth cut-off frequencies, said third cut-off frequency being intermediate said first and second cut-off frequencies, means for applying input signals substantially in common to said low and high frequency amplifiers, a cross-over network energized from and selectively responsive to the outputs of said low and high frequency amplifiers and providing the dual-channel amplifier output, said cross-over network having a cross-over frequency intermediate said third and second cut-off frequencies, a pilot signal source, the frequency of said pilot signal being less than said third cut-off frequency, means for selectively applying said pilot signal from said source to said high frequency amplifier, means responsive to pilot signal output of said high frequency amplifier for providing a control signal, and means for applying said control signal to said high frequency amplifier for stabilization of the gain thereof.

10. Apparatus as in claim 9 and including a filter in circuit with the input to said high frequency amplifier rejecting input signals thereto substantially at pilot signal frequency.

11. Electrical apparatus for amplifying signals in a relatively broad frequency spectrum comprising, at least first and second parallel amplifiers, said first amplifier providing amplification in a spectrum extending upward between first and second cut-off frequencies, said second amplifier providing amplification in a spectrum extending upward between third and fourth cut-off frequencies, said third cut-off frequencies being intermediate said first and second cut-off frequencies, means for applying input signals substantially in common to said first and second amplifiers, a cross-over network energized from and selectively responsive to the outputs of said first and second amplifiers and providing the output of said apparatus, said cross-over network having a cross-over frequency intermediate said third and second cut-off frequencies, a pilot signal source, the frequency of said pilot signal being less than said third cut-off frequency, means for selectively applying said pilot signal from said source to said second amplifier, means for selectively extracting said pilot signal at the output of said second amplifier, means responsive to fluctuations in the relationship between the pilot signal amplitude as applied to said second amplifier and the pilot signal amplitude at the output of said second amplifier to provide a control signal, and means for applying said control signal to said second amplifier for stabilization of the gain thereof.

12. In a signal amplifier having a plurality of substantially parallel operated amplifier channels, means for stabilizing the gain of at least one of said amplifier channels comprising, a pilot signal source, the frequency of said pilot signal source lying outside the normal pass spectrum of said amplifier channel, means for selectively applying said pilot signal from said source to said amplifier channel, means for detecting said pilot signal in the output of said amplifier channel, means continuously responsive to the relationship of said detected pilot signal to the pilot signal applied to said amplifier channel for deriving a gain stabilization control signal, and means for applying said control signal to said amplifier.

13. In an electrical signal amplifier providing a substantially uniform gain characteristic throughout a comparatively broad frequency spectrum, first and second amplifier channels connected in parallel between common input and output, said first amplifier channel effectively accommodating a first portion of said broad frequency spectrum between first and second cut-off frequencies, said second channel effectively accommodating a second portion of said broad frequency spectrum between third and fourth cut-off frequencies, said first and second portions overlapping whereby said third cut-off frequency is substantially less than said second cut-off frequency, means for rendering substantially constant the gain of said second amplifier channel irrespective of variation in signal amplitude applied thereto comprising a pilot signal source, means coupling said pilot signal source to the input of said second channel, means for providing a control signal to said second channel in response to the relative output of the pilot signal from said second channel, the frequency of said pilot signal lying between said first and third cut-off frequencies whereby said pilot signal frequency lies within the frequency spectrum effectively accommodated by said first amplifier channel and outside of the frequency spectrum effectively accommodated by said second amplifier channel.

References Cited in the file of this patent

UNITED STATES PATENTS

| | | |
|---|---|---|
| 1,623,600 | Jammer | Apr. 5, 1927 |
| 1,882,653 | Sedlmayer | Oct. 11, 1932 |
| 2,171,671 | Percival | Sept. 5, 1939 |
| 2,607,851 | Pfleger | Aug. 19, 1952 |